Patented July 26, 1927.

1,636,825

UNITED STATES PATENT OFFICE.

GROVER C. MILLER, OF LOS ANGELES, CALIFORNIA.

MACHINE FOR TREATING TIRE CASINGS.

Application filed July 25, 1925. Serial No. 46,140.

My invention relates to a machine for treating pneumatic tire casings, and it has particular relation to a machine for facilitating the application of a lining of non-adhesive material to the inside walls thereof.

The object of my invention consists in providing a novel type of machine of the character designated, whereby the tire casing may be supported and rotated for any desired purpose. A further object of my invention is to provide a machine whereby a tire casing may be supported and rotated without interfering with the application of the treating material.

During the manufacture of pneumatic tire casings, and before they are vulcanized, it is customary to apply to the inner surface thereof a layer of non-adhesive material, such, for example, as soapstone or potato flour. Such treatment renders the surface non-adhesive, thereby preventing the casing from adhering to a core upon which it is cured. This lining material serves a further purpose of preventing adhesion of the casing and its cooperating inner tube when in actual service. Heretofore this lining of non-adhesive material has been applied by holding the casing manually in any desired manner while a brush or mop, saturated with the lining material, was inserted between the beads. The casing was then rolled or otherwise moved to permit of application of the mop to all portions of the inner surface thereof. Such manual manipulation of the casings renders the operation laborious, consumes considerable time and consequently, is needlessly expensive and inefficient.

By my invention, I have eliminated the foregoing objections, by providing a machine which is adapted to seize a tire casing in such a manner as to permit of inserting a mop saturated with a suitable material into the casing, whereupon the casing is automatically rotated while the mop is held in a substantially fixed position therein.

Figure 1:
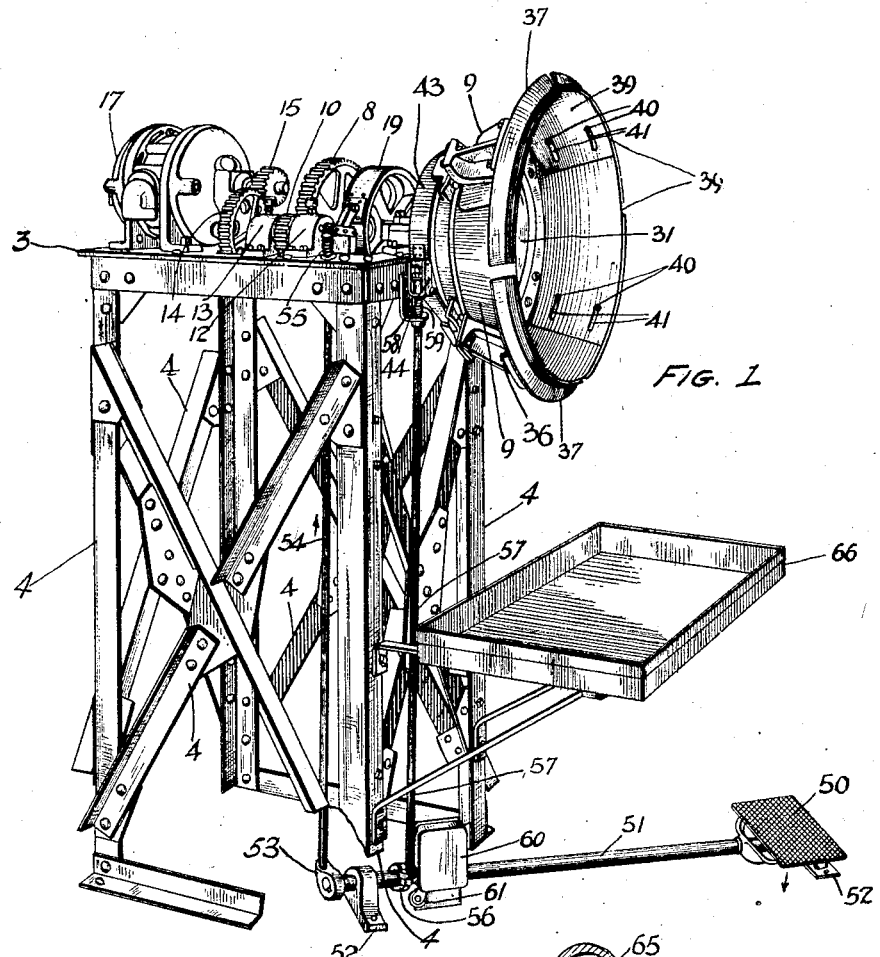
Figure 2:
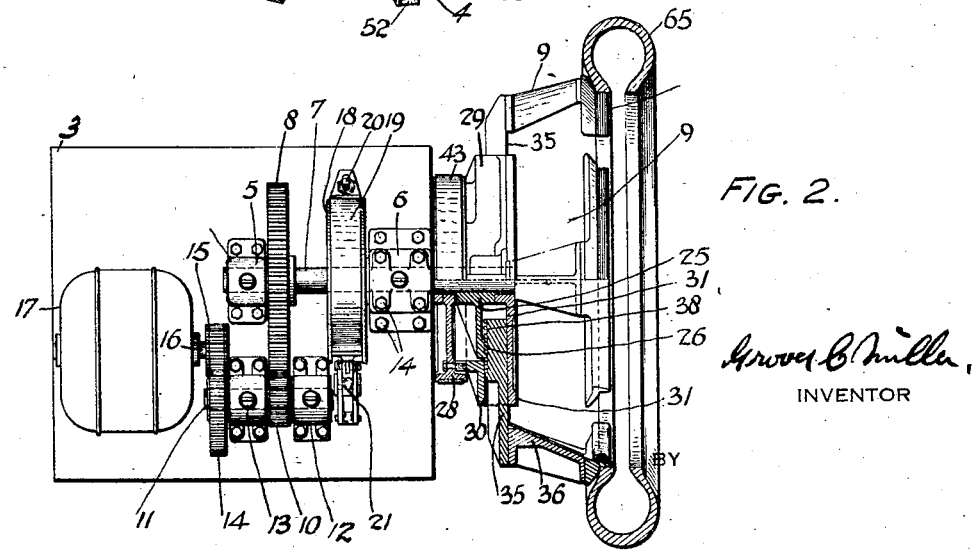

For a more detailed description of my invention, reference may now be had to the accompanying drawings, of which Fig. 1 is a perspective view of a machine constructed in accordance with my invention; and Fig. 2 is a plan view of a machine illustrated in Fig. 1, having a tire casing mounted thereon, a portion of the machine being broken away for the sake of clearness.

As illustrated in the drawing, my machine comprises a table or supporting member 3 mounted upon a suitable supporting structure 4 of proper height to render it most suitable for the operator's convenience. Mounted upon the table 3 are two bearing members 5 and 6, within which is journaled a main shaft 7. The shaft 7 is provided adjacent one end with a driving gear 8, and on the other end is mounted a tire supporting member 9. The gear wheel 8 is driven by means of a pinion 10 mounted upon a shaft 11, journaled in bearings 12 and 13 mounted upon the table 3, which also carries a larger driving gear 14. The gear 14 is adapted to mesh with a pinion 15 mounted upon a shaft 16 of an electric motor 17, or other suitable power operated driving device, mounted upon the table 3. Rigidly mounted upon the shaft 7 is a brake drum 18, which is provided with a collar member 19 that is mounted upon the table 3 by means of a supporting member 20, and which is normally actuated to cause a braking action on the shaft 7 by means of an operating member 21.

The tire supporting member 9 comprises an annular member 25 rigidly mounted upon the shaft 7 and provided adjacent its outer edge with circumferentially extending teeth 26 in the form of a flat spiral. Rotatably mounted upon the shaft 7 is a brake drum 28 upon which is rigidly mounted a housing member 29 provided with four equally spaced openings 30 in the outer periphery thereof. Also, loosely mounted upon the shaft 7 and spaced from the member 29 is a member 31 of disk shape, which cooperates with the member 29 to complete the housing. Disposed within each of the four spaced openings 30 is a radially extending arm 35, on the outer end of each of which is mounted a laterally extending supporting arm 36 having mounted on the end thereof an arcuate tire supporting member 37. The inner end of the arm 35 is provided with a plurality of arcuate teeth 38 which mesh with the spiral scrolls 26 on the member 25. The members 35 are adapted to be moved radially within the opening 30 by means of relative movement of the member 25 and the housing 29, the arm 35 being supported in sliding engagement between the member 29 and the member 31.

Secured to each of the members 36 is an arcuate resilient sheet metal member 39, the ends of each of which overlap similar members mounted upon adjacently disposed casing supporting members 37. The members 39 are each provided at one end with pins 40, and at the other end with circumferentially elongated slots 41 through which the pins 40 of the adjacent member 39 project. The slots 41 are so arranged in a circumferential direction that the members 39 may be moved relative to each other so as to permit expansion and contraction of the members 37. The brake drum 28 is provided with a suitable braking sleeve 43 which, in turn, is provided with a connecting member 44, by means of which the tension of the sleeve, and the resulting braking action, may be controlled at will.

In order to properly control the machine, it is provided with a pedal 50 mounted upon a pivotally mounted shaft 51 suitably supported in journals 52 mounted upon the floor on which the machine stands. The shaft 51 is provided with a lug 53 connected to a vertically extending rod 54 which passes through a suitable opening in the table 3, and is connected to the actuating member 21 of the braking member 19. Between the table 3 and the member 21 is mounted a compression spring 55 which tends to normally release the member 21 from an energized or braking position. Mounted upon the shaft 51 is a second lug 56 which is connected to a vertically extending rod 57 which, in turn, is connected to the actuating member 44 of the braking sleeve 43. The rod 57 passes through a guiding bracket 58 mounted upon the table 3. Disposed intermediate the connecting member 44 and the bracket 58 is a compression spring 59, which serves to retain the member 44 in its uppermost or non-braking position.

An electrical switching mechanism 60 is mounted upon the supporting structure 4 in a position adjacent the shaft 51. The switching mechanism 60 is provided with an actuating lever 61 which is engaged by the lug 56 when it is moved to actuate the braking member 43. The members 53 and 54, and 56 and 57, respectively, are so connected as to permit of relatively slight movement therebetween, necessitated by the vertical movement of the members 54 and 57 and the circumferential movement of the members 53 and 56.

Having described in detail the operating portion of the mechanism illustrated, its operation is as follows. The operator depresses the pedal 50, thus moving the rod 54 upwardly and releasing the braking action of the member 19 upon the drum 18, and at the same time effecting a downward movement of the rod 57 causing a braking action between the member 43 and the braking drum 28. Also, the lug 56 engages the switch operating member 61, thus closing an electrical circuit within the switch box 60, energizing the motor 17. The motor 17 rotates the shaft 16 and the pinion 15 mounted thereon, thereby driving the shaft 11 through the gear wheel 14. The pinion 10 mounted on the shaft 11 drives the shaft 7 through the gear wheel 8. As the rod 54 has been raised, the braking members 18 and 19 permit free movement of the shaft 7. The member 25, being rigidly mounted on the shaft 7, is rotated therewith. By reason of the fact that the rod 57 is moved downwardly and the brake sleeve 43 is in engagement with the brake drum 28, the housing 29, the radially extending arms 35, and the casing supporting member 9 do not rotate. It will be observed that the teeth 38 and the relatively movable intermeshing scroll 26 provide a construction which permits limited relative rotation between the member 25 and the arms 35, the action of the intermeshing teeth and scroll causing the four arms 35 to move radially outwardly simultaneously. The tire casing 65 is placed over the tire-receiving members 37 in such manner that the latter will firmly engage one bead of the casing as the member 25 is rotated to move the arms 35 radially toward their extended position. When the members 37 so engage the casing, the outward radial movement thereof is arrested, thereby locking the scroll and teeth against further relative movement. There is then a rotative force exerted by the member 25 which is transmitted through the spiral scroll 26 and spiral teeth 38 tending to rotate the arms 35, and consequently the housing 29, against the action of the brake shoe 43. When the casing begins to rotate, it indicates that the members 37 are in their proper clamping engagement with respect to the bead of the tire, and the operator releases his foot from the pedal 50. The spring 59 immediately returns the rods 54 and 57, and also the switching lever 61, to their original positions, thereby de-energizing the motor and the brake 43 but causing the brake band 19 to engage the drum 18 lightly to stop rotation of the shaft 7.

The operator then places within the tire casing a mop saturated with a suitable solution of lining material, permitting the handle of the mop to extend radially between the beads. The operator holds the handle of the mop, and again presses the foot lever 50, in the direction indicated by the arrow, a distance sufficient to energize the motor 5, but only far enough to actuate the braking member 43 slightly. The tire casing is thereby rotated while the relative movement of the mop and the tire casing insures an even and thorough distribution of the lining material over the interior surface of the casing.

When the lining material has been thoroughly spread over the interior surface of the casing, it is desirable to remove the casing from the machine. The operator thereupon withdraws the mop from the interior of the casing and releases the foot lever 50, whereupon it returns to normal position. As the lever passes through the neutral point, the switching lever 61 is actuated and the motor 17 is de-energized. As the movement of the lever 50 is continued in the same direction, the rod 54 is drawn downwardly, thus causing the braking member 19 to engage the braking drum 18. By this means the shaft 7, the motor 17 and the intermediate gearing is stopped, which results in stopping the member 25. As the member 25 remains stationary, the member 29, by reason of the momentum of the tire supporting member 9 and the tire casing, continues to rotate and the arms 35 are consequently drawn inwardly by reason of the traveling of the teeth 38 of the arms 35 on the scroll-like surface 26 of the member 25. The inward movement of the arms 35 releases the casing which is moved to one side, the machine then being ready to receive a second casing.

For the convenience of the operator, a container or tray 66 is mounted beneath the tire supporting member and is secured to the table supporting structure 4. The tray 66 may contain a supply of the casing lining material, and may also serve as a suitable receptacle for the mop when it is not in use.

From this description, it will be apparent that I have provided a machine in which, by the movement of a single foot lever, the arms 36 may be simultaneously moved outwardly to grasp a tire casing and to rotate it in such manner as not to interfere with the application of the lining material. Also, it will be apparent that when the lever is moved to the opposite position, the tire carrying arms are automatically moved inwardly, thus releasing the casing and preparing the machine for the treatment of a second casing.

Although I have illustrated but four arms adapted to expand, it will be apparent that any suitable number of members may be employed. It will further be apparent that the machine is not limited to the application of a lining material, but may be employed for any one of a number of purposes in which it is desirable to rotate the tire casing.

Although I have illustrated but one form of my invention and have described in detail but a single application thereof, it will be apparent to those skilled in the art that my invention is not so limited but that various minor modifications and changes may be made therein without departing from the spirit of my invention or from the scope of the appended claims.

What I claim is:

1. A machine for lining tire casings comprising a rotatable member including an expansible group of sections adapted to be expanded to engage a tire casing and contracted to release the same, means for rotating said member including mechanism automatically operable in conjunction with the member for controlling the contraction and expansion of the sections.

2. A machine for treating tire casings comprising a rotatably driven shaft provided with a relatively rotatable tire supporting member mounted thereon, means operatively connected to the shaft and the member including a mechanism automatically operated by the shaft for limiting relative rotation between the shaft and said member, a brake drum rigidly mounted on the shaft, a second drum rotatably journaled upon the the shaft and connected to the tire supporting member, and means for simultaneously exerting brake forces upon the one drum and releasing braking forces from the other drum.

3. A machine for treating tire casings comprising a rotatably driven shaft provided with a relatively rotatable tire supporting member mounted thereon, means operatively connected to the shaft and member for limiting relative rotation therebetween, a brake drum rigidly mounted on said shaft, a second brake drum rotatably mounted on said shaft and connected to the tire supporting member, and a single means having connections to the drums for exerting a braking action upon either of the latter.

4. A machine for treating tire casings comprising a rotatable shaft provided with a relatively rotatable tire supporting member mounted thereon, means operatively connected to and operable to rotate both the shaft and the member, a brake drum rigidly mounted on the shaft, a second brake drum rotatably mounted on said shaft and connected to the tire supporting member, and a single means operatively connected to and adapted to control actuation of both braking members and to control the energization of the first mentioned means.

5. A machine for treating tire casings comprising a rotatably driven shaft, means rotatably mounted on the shaft provided with a plurality of radially movable tire casing supporting members, and means operatively connected to the shaft and to the supporting members to move the latter radially and to rotate concurrently the rotatable means and the shaft after they have been relatively rotated a predetermined number of revolutions.

6. A machine for treating tire casing comprising a rotatable shaft, means rotatably mounted on the shaft provided with a plurality of radially movable tire casings supporting members, means operatively connected to and serving to rotate both the shaft and the member, and means operatively connected to the driving means and to the supporting members to move the latter outwardly and to utilize the inertia of the supporting members to move them inwardly.

7. A machine for treating tire casings comprising a rotatable shaft, means rotatably mounted on the shaft provided with a plurality of radially movable tire casing supporting members, means for rotating the shaft and the members, means operatively connected to the second mentioned means and to the supporting members to move the latter inwardly and to utilize the inertia of the rotatable members to move said members outwardly.

8. A machine for treating tire casings comprising a rotatable shaft, means rotatably mounted on the shaft provided with a plurality of radially movable tire casing supporting members, means for rotating the shaft and the members, and means operatively connected to the second named means and to the supporting members for utilizing the stationary inertia of the supporting members to cause the latter to move outwardly and for utilizing the momentum of the supporting members when rotating to cause them to move inwardly.

9. A machine for treating tire casings comprising a rotatable shaft, means rotatably mounted on the shaft provided with a plurality of radially movable tire casing supporting members, means for rotating the shaft and the members, and means operable in conjunction with the first mentioned means for utilizing the stationary inertia of the tire supporting members to cause the latter to move outwardly and for utilizing the momentum of the tire supporting members when rotating to cause them to move inwardly.

10. In a machine for treating tire casings, a plurality of radially movable arms each provided with a toothed surface, and a relatively rotatable member provided with teeth in the form of a flat spiral, said toothed surface being in mesh with the spiral teeth to move the arms radially when the members are relatively rotated.

11. A machine for treating tire casings comprising a rotatably driven shaft provided with a plurality of radially movable arms rotatably mounted thereon and adapted to engage a tire casing, a power transmitting member rigidly mounted upon the shaft in threaded engagement with the arms and adapted to actuate the latter both radially and rotatably when the shaft is rotated, means for retarding rotation of the shaft and means for retarding rotation of the arms.

12. A machine for treating tire casings comprising a rotatably driven shaft provided with a plurality of radially movable arms rotatably mounted thereon and adapted to engage a tire casing, a member mounted upon the shaft in threaded engagement with the arms and adapted to actuate the latter both radially and rotatably when the shaft is rotated, means for retarding rotation of the shaft, means for retarding rotation of the arms, and a single lever operatively connected to all of said means and to the shaft and adapted to actuate both of the retarding means.

13. A machine for treating tire casings comprising a rotatably driven shaft provided with a plurality of radially movable arms rotatably mounted thereon and adapted to engage a tire casing, a member mounted upon the shaft in operative engagement with the arms and adapted to actuate the latter both radially and rotatably when the shaft is rotated, means for retarding rotation of the shaft, a switch device for controlling the energization of the shaft, and a single lever adapted to actuate the switch device and the retarding means, the lever constituting an operative connection between each of said means and the shaft.

14. A machine for treating tire casings comprising a rotatably driven shaft provided with a plurality of radially movable arms rotatably mounted thereon and adapted to engage a tire casing, a member rigidly mounted upon the shaft in threaded engagement with the arms and adapted to actuate the latter both radially and rotatably when the shaft is rotated, means for retarding rotation of the shaft, means for retarding rotation of the arms, means including a switch for controlling the energization of the shaft, and a single lever adapted to actuate the switching means and one of the retarding means when moved in one direction and to actuate the other retarding means when moved in the opposite direction, the lever constituting an operative connection between each of said means and the shaft.

In witness whereof, I have hereunto signed my name.

GROVER C. MILLER